United States Patent Office 2,832,796
Patented Apr. 29, 1958

2,832,796

7-CINNAMOYL-OCTAHYDROPHENANTHRENE-1-CARBONITRILES

Willard M. Hoehn, Wilmette, Ill., assignor to G. D. Searle & Co., Chicago, Ill., a corporation of Delaware No Drawing. Application April 10, 1957
Serial No. 651,827

7 Claims. (Cl. 260—464)

The present invention is concerned with polyhydrophenanthrene carbonitriles. More particularly, it is concerned with 7-cinnamoyl and 7-alkoxycinnamoyl substitution products of 1,4a-dimethyl-1,2,3,4,4a,9,10,10a-octahydrophenanthrene-1-carbonitrile and of 1,4a-dimethyl-9 - oxo - 1,2,3,4,4a,9,10,10a - octahydrophenanthrene - 1- carbonitrile. The compounds of this invention can therefore be represented by the structural formula

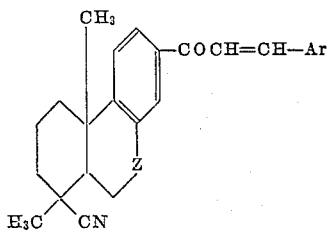

wherein Z can represent the carbonyl group (C=O) or the methylene group (CH$_2$), and Ar can represent an aromatic radical. In preferred embodiments of this invention, the aromatic radical can be a phenyl radical, or an alkoxyphenyl radical of the type —C$_6$H$_4$—O-lower alkyl wherein the lower alkyl group is a straight- or branched-chain alkyl radical containing fewer than 9 carbon atoms. Included within the scope of the term Ar are therefore such alkoxyphenyl radicals as o-methoxyphenyl, m-methoxyphenyl, p-methoxyphenyl, o-ethoxyphenyl, m-ethoxyphenyl, p-ethoxyphenyl and homologs of the foregoing.

A satisfactory starting material for the manufacture of the compounds of this invention is the dehydrogenated rosin nitrile prepared by reacting dehydrogenated rosin with ammonia at an elevated temperature and removing the water from the reaction mixture as it is formed, for example according to the processes disclosed in U. S. 2,534,297 to Putnam. The product obtained from dehydrogenated rosin by the methods of the aforementioned patent is crude dehydroabietonitrile, which can be crystallized to give purified dehydroabietonitrile, or 1,4a-dimethyl - 7 - isopropyl - 1,2,3,4,4a,9,10,10a - octahydrophenanthrene-1-carbonitrile, as disclosed therein.

Upon oxidation of dehydroabietonitrile by such means as treating it with a solution of chromium trioxide in aqueous acetic acid, certain valuable oxidation products are formed. Two of these oxidation products, 1,4a-dimethyl - 7 - acetyl - 1,2,3,4,4a,9,10,10a - octahydrophenanthrene-1-carbonitrile and 1,4a-dimethyl-7-acetyl-9-oxo-1,2,3,4,4a,9,10,10a - octahydrophenanthrene - 1 - carbonitrile can be isolated from the oxidation mixture by procedures described more fully hereinafter. These oxidation products correspond to the formula

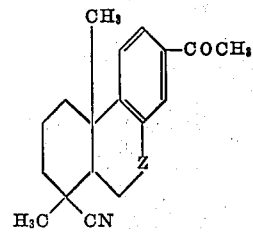

wherein Z is defined as hereinbefore. Each of these compounds undergoes condensation reactions with aromatic aldehydes, representatively with benzaldehyde and alkoxy-substituted benzaldehydes, in the presence of a basic reaction medium such as an alkali metal hydroxide in a lower alkanol, or an alkali metal alkoxide in a lower alkanol. Condensation and spontaneous dehydration occur, with the formation of the unsaturated ketones of this invention. In representative cases, the desired reaction product is isolated by dilution of the reaction mixture with water, removal of the organic solvent and unreacted aldehyde by distillation with steam, and crystallization of the water-insoluble product which remains.

The compounds of the present invention have useful pharmacological properties, and in particular are antibacterial agents. They can also be employed as adjuvants in hormonal therapy. As a specific example of their use, when they are administered with cortisone, they inhibit the ability of cortisone to promote a streptococcus infection.

This invention will appear more fully from the examples which follow. These examples are set forth by way of illustration only and it will be understood that the invention is not to be construed as limited in spirit or in scope by the details contained therein, as many modifications in materials and methods will be apparent from this disclosure to those skilled in the art. In these examples, temperatures are given in degrees centigrade (° C.), distillation pressures in millimeters (mm.) of mercury and quantities of materials in parts by weight.

*Example 1*

To a solution of 56 parts of dehydroabietonitrile in 840 parts of acetic acid, warmed to about 70° C., there is gradually added a solution of 160 parts of chromium trioxide in 90 parts of water and 840 parts of acetic acid. The rate of addition is so regulated that the temperature of the reaction mixture is maintained at about 70° C. It is satisfactory to carry out the addition over a period of about 6 to 8 hours, with external heating or cooling as required to maintain the temperature in the proper range. To the cooled mixture is then added a solution of 50 parts of methanol in 500 parts of water. Most of the acetic acid is removed by distillation in a vacuum. As the acetic acid is distilled, it is periodically replaced with water until no more than about 10% of the original quantity of acetic acid remains, and the liquid phase is principally water. The insoluble, gummy product now present is dissolved in ether, and this ethereal solution is combined with an ether extract of the aqueous phase. The combined ethereal solution is washed with several portions of water, with 2% sodium hydroxide solution, and with several portions of water. Upon evaporation of the dried ether solution and crystallization of the residue from ethanol, there is obtained 1,4a-dimethyl - 7 - acetyl - 9 - oxo - 1,2,3,4,4a,9,10,10a - octahydrophenanthrene-1-carbonitrile which melts at about 167–168° C. and has the structural formula

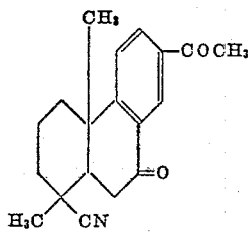

Example 2

A solution of 2 parts of 1,4a-dimethyl-7-acetyl-9-oxo-1,2,3,4,4a,9,10,10a - octahydrophenanthrene - 1 - carbonitrile and 1 part of benzaldehyde in 20 parts of refluxing methanol is treated with a methanolic solution of sodium methoxide prepared by dissolving 0.25 part of sodium in 8 parts of methanol. Heating under reflux is continued for 5 minutes. The gummy or semi-crystalline product which separates when the reaction mixture is chilled is collected and recrystallized from methanol. This compound melts at about 100–102° C. and is 1,4a-dimethyl - 7 - cinnamoyl - 9 - oxo - 1,2,3,4,4a,9,10,10a-octahydrophenanthrene-1-carbonitrile. The structural formula is

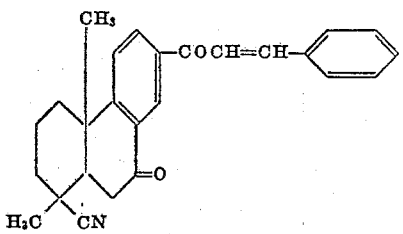

Example 3

To a refluxing solution of 4.4 parts of 1,4a-dimethyl-7-acetyl - 9 - oxo - 1,2,3,4,4a,9,10,10a - octahydrophenanthrene-1-carbonitrile and 2 parts of p-methoxybenzaldehyde in 20 parts of methanol is added a methanolic solution of sodium methoxide prepared by dissolving 0.5 part of sodium in 16 parts of methanol. Heating under reflux is continued for an additional 20 minutes. The mixture is chilled, and the gummy product is separated and dissolved by stirring it with 40 parts of warm methanol and adding as much methylene chloride as is required to bring about complete solution. Upon concentration of this solution, a crystalline product separates. This material is collected and purified by recrystallization from aqueous acetic acid. The crystals obtained tend to retain solvent. This compound is 1,4a-dimethyl-7-(p-methoxycinnamoyl) - 9 - oxo - 1,2,3,4,4a,9,10,10a - octahydrophenanthrene-1-carbonitrile which melts at about 160–162° C. and has the structural formula

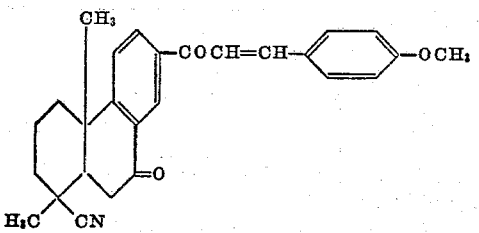

Example 4

The ethanolic crystallization liquors remaining after the purification of 1,4a-dimethyl-7-acetyl-9-oxo-1,2,3,4,4a,-9,10,10a-octahydrophenanthrene-1-carbonitrile, as described in Example 1, are concentrated to dryness, and the residue is subjected to distillation at about 0.1 mm. A distillate which corresponds to the major portion of the residue is collected at a distillation temperature of about 200° C. (bath temperature about 220° C.). The distillate is further fractionated by dissolving it in benzene, pouring it on a chromatography column prepared from 30 parts of silica for each part of distillate to be fractionated, and eluting the column with benzene and with mixtures of benzene and ethyl acetate containing gradually increasing proportions of ethyl acetate. The desired compound, 1,4a - dimethyl - 7 - acetyl - 1,2,3,4,4a,9,10,10a - octahydrophenanthrene-1-carbonitrile is eluted from the column at a satisfactory rate with a 2 volume per cent solution of ethyl acetate in benzene. This compound is recovered by concentrating the eluates to a very small volume, collecting the crystalline material on a filter, and washing it with ether. The product thus obtained melts at about 115-116.5° C. and has a specific rotation of about +58.5° in chloroform solution. The structural formula is

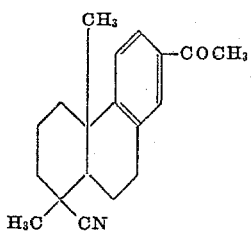

Example 5

A solution is prepared from 3.5 parts of 1,4a-dimethyl-7 - acetyl - 1,2,3,4,4a,9,10,10a - octahydrophenanthrene-1-carbonitrile and 6 parts of o-ethoxybenzaldehyde in 140 parts of hot methanol. To this is added a methanolic solution of sodium methoxide prepared by dissolving 2.0 parts of sodium in 64 parts of methanol, and the reaction mixture is heated under reflux for 20 minutes. Methanol and unreacted o-ethoxybenzaldehyde are then removed by distillation with steam. The aqueous phase and the insoluble product which remain in the distillation flask are extracted with methylene chloride. The methylene chloride extract is washed with water and concentrated to dryness. A solution of the residue thus obtained in methanol is diluted with water and chilled. The product which separates is collected and washed with water. It is 1,4a - dimethyl - 7 - (o - ethoxycinnamoyl) - 1,2,3,4,4a-9,10,10a-octahydrophenanthrene-1-carbonitrile which exhibits infrared absorption maxima at about 4.47, 6.03, 6.17 and 6.28 microns, and an ultraviolet absorption maximum at about 331 millimicrons. The structural formula is

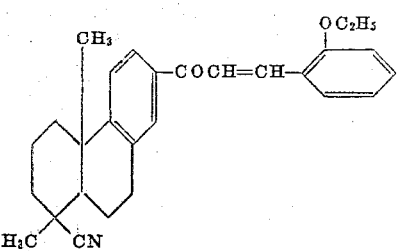

By the foregoing procedure, with the substitution of 6 parts of p-methoxybenzaldehyde for the o-ethoxybenzaldehyde, the compound obtained is 1,4a-dimethyl-7-(p-methoxycinnamoyl) - 1,2,3,4,4a,9,10,10a - octahydrophenanthrene-1-carbonitrile.

Example 6

A solution of 2 parts of 1,4a-dimethyl-7-acetyl-1,2,3,4,-4a,9,10,10a - octahydrophenanthrene - 1 - carbonitrile and 5 parts of benzaldehyde in 80 parts of methanol is mixed with a methanolic solution of sodium methoxide prepared by dissolving 1.25 parts of sodium in 40 parts of methanol. The reaction mixture is heated under reflux for 30 minutes. Methanol and unreacted benzaldehyde are then removed by distillation with steam, and the insoluble product which separates is collected on a filter. A solution of this product in a small volume of methylene chloride is filtered and diluted with methanol. The solution is concentrated until substantially all of the methylene chloride has been vaporized, following which the hot solution is diluted with water and allowed to cool. The crystalline product which separates is collected on a filter. It is 1,4a - dimethyl - 7 - cinnamoyl - 1,2,3,4,4a,9,10,10a-octahydrophenanthrene-1-carbonitrile which melts at about 120–121° C. and has the structural formula

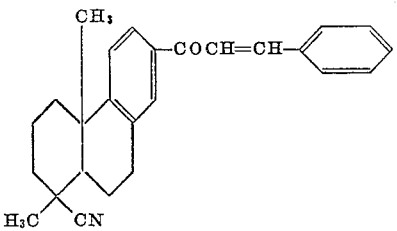

What is claimed is:
1. A compound of the structural formula

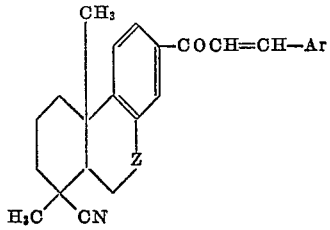

wherein Z is a member of the class consisting of the carbonyl group and the methylene group, and Ar is a member of the class consisting of the phenyl radical and lower alkoxyphenyl radicals.

2. 1,4a - dimethyl - 7 - cinnamoyl - 1,2,3,4,4a,9,10,10a-octahydrophenanthrene-1-carbonitrile.

3. 1,4a-dimethyl - 7 - (lower alkoxycinnamoyl)-1,2,3,-4,4a,9,10,10a - octahydrophenanthrene - 1 - carbonitrile.

4. 1,4a - dimethyl - 7 - (p-methoxycinnamoyl)-1,2,3,4,-4a,9,10,10a-octahydrophenanthrene-1-carbonitrile.

5. 1,4a-dimethyl - 7 - cinnamoyl - 9 - oxo - 1,2,3,4,4a,-9,10,10a-octahydrophenanthrene-1-carbonitrile.

6. 1,4a - dimethyl - 7 - (lower alkoxycinnamoyl)-9-oxo - 1,2,3,4,4a,9,10,10a - octahydrophenanthrene - 1 - carbonitrile.

7. 1,4a - dimethyl - 7 - (p-methoxycinnamoyl) - 9-oxo-1,2,3,4,4a,9,10,10a - octahydrophenanthrene - 1 - carbonitrile.

References Cited in the file of this patent
UNITED STATES PATENTS
2,750,367    Sanderson _____ June 12, 1956